United States Patent
Chen

[19]

[11] Patent Number: 6,109,397

[45] Date of Patent: Aug. 29, 2000

[54] STRUCTURE OF A BRAKE ARM ASSEMBLY FOR CALIPER BRAKES

[75] Inventor: Tse-Ming Chen, Taipei, Taiwan

[73] Assignee: Yann-Haur Industry Co., Ltd., Chang Hua Hsien, Taiwan

[21] Appl. No.: 09/222,838

[22] Filed: Dec. 30, 1998

[51] Int. Cl.[7] .............................. B62L 1/14; F16D 49/16; F16D 65/00
[52] U.S. Cl. ..................................... 188/24.22; 188/24.12
[58] Field of Search ........................... 188/24.11–24.22, 188/26, 72.9, 73.1, 234, 205 R, 206 R; D12/179

[56] References Cited

U.S. PATENT DOCUMENTS

| | | | |
|---|---|---|---|
| 4,391,353 | 7/1983 | Mathauser | 188/24.22 |
| 5,564,531 | 10/1996 | Lumpkih | 188/24.19 |
| 5,775,466 | 7/1998 | Banyas et al. | 188/24.22 |
| 5,788,020 | 8/1998 | Tseng | 188/24.12 |
| 5,913,386 | 6/1999 | Chen et al. | 188/24.22 |
| 5,960,913 | 10/1999 | Kuo | 188/24.12 |

*Primary Examiner*—Douglas C. Butler
*Attorney, Agent, or Firm*—A&J

[57] ABSTRACT

A brake arm assembly for caliper brakes includes a brake block having a post, a seat formed with a pair of lugs at one side thereof and an elongated slot configured to receive the post, each of the lugs having a through hole, an arm having an intermediate portion having two opposite sides formed with two recesses configured to receive the two lugs, the arm having a front side formed with two threaded holes in each of which is fitted a compressed spring, the intermediate portion having an elongated opening between the two threaded holes, two sleeves fitted in two sides of the elongated opening, two first bolts turned through the seat to engage with the two threaded holes of the arm, and a second bolt extending through the through hole of the seat, the sleeves and the elongated opening.

1 Claim, 4 Drawing Sheets

STRUCTURE OF A BRAKE ARM ASSEMBLY FOR CALIPER BRAKES

BACKGROUND OF THE INVENTION

1. Field of the Invention

This invention is related to an improvement in the structure of a brake arm assembly for caliper brakes and in particular to one which can prevent a bicycle from being elevated by the reaction force when the caliper brake is activated.

2. Description of the Prior Art

FIG. 1 illustrates a prior art brake arm assembly for caliper brakes. As shown, the brake block 2 has a post 21 extending through an elongated slot 111 of the seat 11 of the brake arm 1 to engage with a nut so that the brake block 2 is rigidly mounted on the brake arm 1. At the same time as the caliper brake is activated, the brake block 2 will be directly pushed by the brake arm 1 against the wheel rim thus often raising the wheel and causing danger to the rider.

Therefore, it is an object of the present invention to provide an improvement in the structure of a brake arm assembly for caliper brakes which can obviate and mitigate the above-mentioned drawbacks.

SUMMARY OF THE INVENTION

This invention is related to an improvement in the structure of a brake arm assembly for caliper brakes.

It is the primary object of the present invention to provide an improvement in the structure of a brake arm assembly for caliper brakes having a floating seat which will cause the brake block to apply a resilient force against the wheel rim when the caliper brake is activated so that the wheel rim will not stop at the same time as the caliper brake is activated thus preventing the wheel of the bicycle from being elevated and therefore ensuring the rider's safety.

It is another object of the present invention to provide an improvement in the structure of a brake arm assembly for caliper brakes which includes a brake block having a post, a seat formed with a pair of lugs at one side thereof and an elongated slot configured to receive the post, each of the lugs having a through hole, an arm having an intermediate portion having two opposite sides formed with two recesses configured to receive the two lugs, the arm having a front side formed with two threaded holes in each of which is fitted a compressed spring, the intermediate portion having an elongated opening between the two threaded holes, two sleeves fitted in two sides of the elongated opening, two first bolts turned through the seat to engage with the two threaded holes of the arm, and a second bolt extending through the through hole of the seat, the sleeves and the elongated opening.

DETAILED DESCRIPTION OF THE PREFERRED EMBODIMENT

Figure 1:
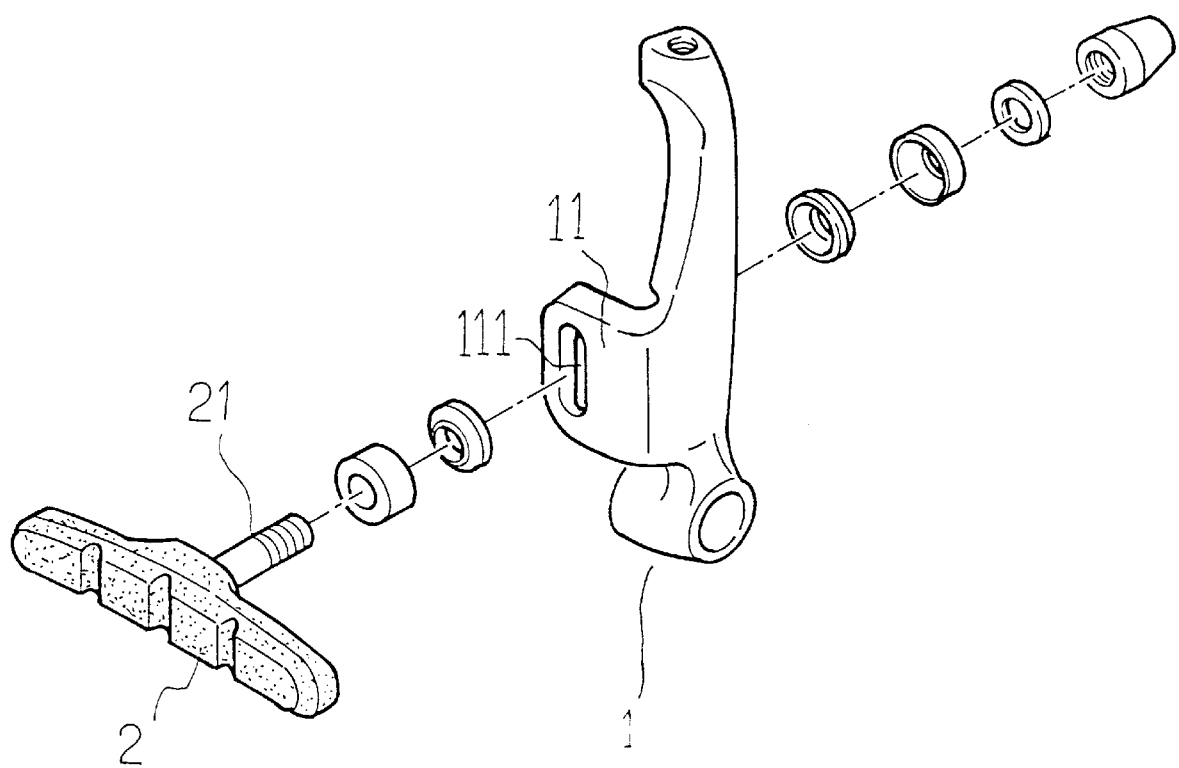
FIG. 1 is an exploded view of a prior art brake arm assembly.
Figure 2:
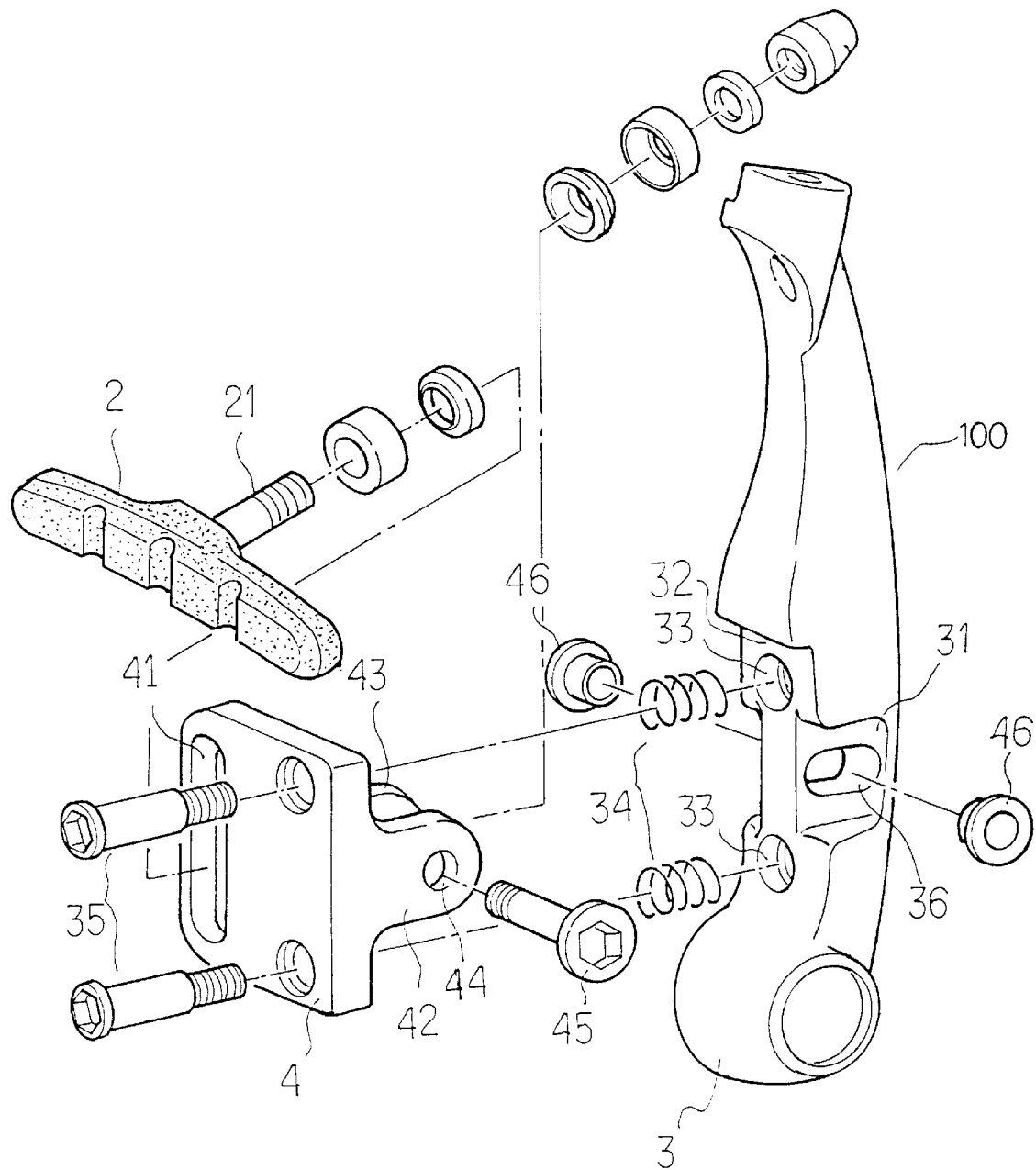
FIG. 2 is an exploded view of a brake arm assembly for caliper brakes according to a preferred embodiment of the present invention.
Figure 3:
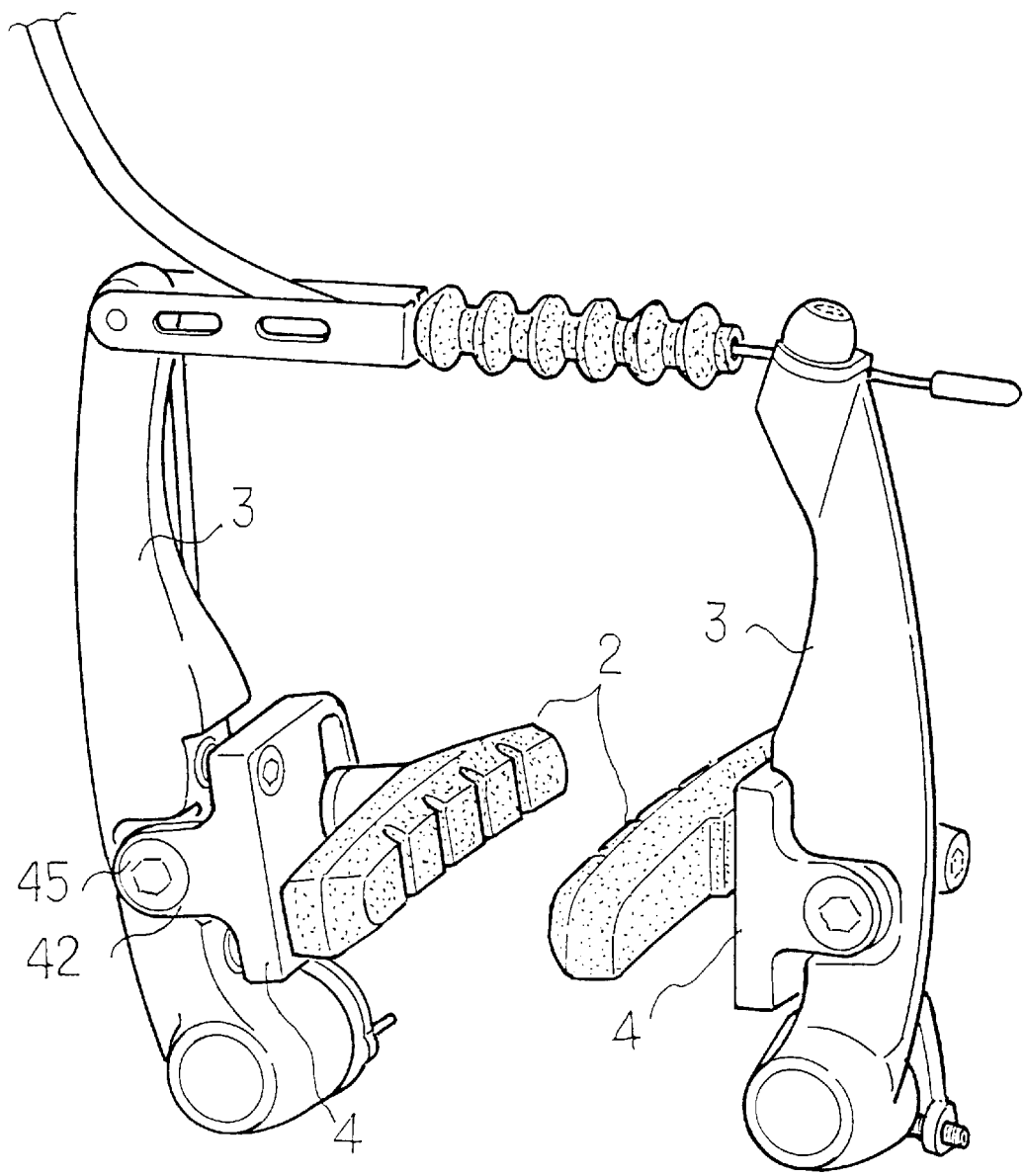
FIG. 3 is a perspective view of a caliper brake equipped with two brake arm assemblies according to the present invention.
Figure 4:
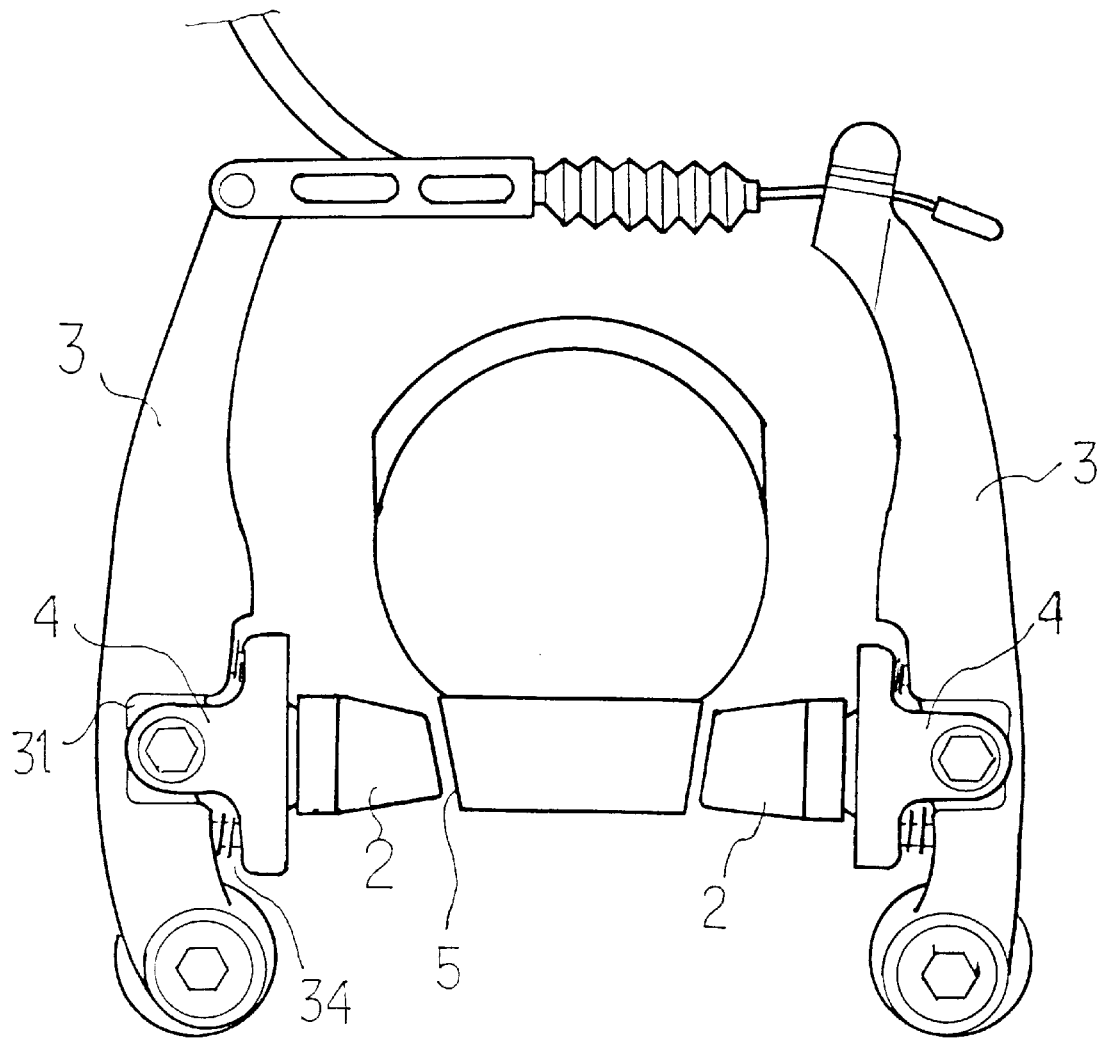
FIG. 4 is a front view of the caliper brake equipped with two brake arm assemblies according to the present invention.

With reference to the drawings and in particular to FIGS. 2, 3 and 4 thereof, the brake arm assembly 100 for caliper brakes according to the present invention generally comprises an arm 3, a seat 4 and a brake block 2. The seat 4 is formed with a pair of lugs 42 and 43 at one side thereof and an elongated slot 41 for receiving a post 21 of the brake block 2. The post 21 of the brake block 2 is engaged with a nut (shown but not numbered) for fixedly mounting the brake block 2 on the seat 4. The intermediate portion of the arm 3 has two opposite recesses 31 at two sides adapted to receive the two lugs 42 and 43. The front side 32 of the intermediate portion of the arm 3 has two threaded holes 33 in each of which is fitted a compressed spring 34. Two bolts 35 are turned through the seat 4 to engage with the two threaded holes 33 of the arm 100. The two lugs 42 and 43 are each formed with a through hole 44. The intermediate portion of the arm 3 is formed with an elongated opening 36 between the two threaded holes 33. Two sleeves 46 are fitted in two sides of the elongated opening 36. A bolt 45 extends through the holes 44 of the seat 4, the sleeves 46 and the elongated opening 36 to engage with a nut (not shown).

When the caliper brake is activated, the brake block 2 will press against the wheel rim 5 and the seat 4 will provide a cushioning effect to the wheel rim 5 thereby preventing the wheel rim 5 from being locked at the same time as the brake is applied and therefore ensuring safety of the rider. Furthermore, as the brake block 2 is in contact with the wheel rim 5, the brake block 2 will be slightly moved so that the bearing surface of the brake block 2 will be closedly engaged with the wheel rim 5.

Accordingly, the present invention resides in a floating seat 4 which will cause the brake block 2 to apply a resilient force against the wheel rim 5 when the caliper brake is activated, thereby adjusting the brake block 2 to be closedly engaged with the wheel rim 5. Furthermore, when the brake block 2 presses against the wheel rim 5, the seat 4 will first move inwardly along the elongated opening 36 until it contacts the end of the elongated opening 36 and then move outwardly together with the arm 3 to stop the wheel rim 5. As a consequence, the wheel rim 5 will not be stopped at the same time as the caliper brake is activated.

Furthermore, the spring 34 may be replaced with a resilient plastic member as required.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

I claim:

1. A brake arm assembly for caliper brakes comprising:
   a brake block having a post;
   a seat formed with a pair of lugs at one side thereof and an elongated slot configured to receive said post, each of said lugs having a through hole;
   an arm having an intermediate portion having two opposite sides formed with two recesses configured to receive said two lugs, said arm having a front side formed with two threaded holes in each of which is fitted a compressed spring, said intermediate portion having an elongated opening between said two threaded holes;

two sleeves fitted in two sides of said elongated opening;

two first bolts turned through said seat to engage with said two threaded holes of said arm; and a second bolt extending through said through hole of said seat, said sleeves and said elongated opening.

* * * * *